US011699897B2

(12) United States Patent
Naganishi et al.

(10) Patent No.: US 11,699,897 B2
(45) Date of Patent: Jul. 11, 2023

(54) CLAMP FOR FLAT CONDUCTOR, WIRE HARNESS, AND ASSEMBLY

(71) Applicants: Yazaki Corporation, Tokyo (JP); TOYOTA JIDOSHA KABUSHIKI KAISHA, Aichi-ken (JP)

(72) Inventors: Yukinari Naganishi, Susono (JP); Itsuo Wakabayashi, Seto (JP); Kazunori Takata, Okazaki (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/227,947

(22) Filed: Apr. 12, 2021

(65) Prior Publication Data

US 2021/0328418 A1 Oct. 21, 2021

(30) Foreign Application Priority Data

Apr. 15, 2020 (JP) ................................ 2020-073042

(51) Int. Cl.
*H02G 3/32* (2006.01)
*B60R 16/02* (2006.01)

(52) U.S. Cl.
CPC .......... *H02G 3/32* (2013.01); *B60R 16/0215* (2013.01)

(58) Field of Classification Search
CPC .. B60R 16/0215; B60R 16/0207; H02G 3/30; H02G 3/32; H01B 7/0045
See application file for complete search history.

(56) References Cited

U.S. PATENT DOCUMENTS

2020/0290531 A1* 9/2020 Iwahara .................. H02G 3/32

FOREIGN PATENT DOCUMENTS

| | | | | | |
|---|---|---|---|---|---|
| JP | H0711831 | U | * | 7/1993 | B60R 16/02 |
| JP | 2005-287276 | A | | 10/2005 | |
| JP | 2000270448 | A | * | 10/2005 | H02G 3/30 |
| JP | 2013-85396 | A | | 5/2013 | |
| JP | 2016034230 | A | * | 3/2016 | H02G 3/32 |
| JP | 2018-93570 | A | | 6/2018 | |
| KR | 20170106638 | A | * | 9/2017 | B60R 16/0215 |
| WO | 2013/054490 | A1 | | 4/2013 | |

* cited by examiner

*Primary Examiner* — Paresh Paghadal
(74) *Attorney, Agent, or Firm* — Sughrue Mion, PLLC

(57) ABSTRACT

A clamp for a flat conductor is used in attaching the flat conductor to an attachment target. The clamp includes: a clip portion to be engaged with the attachment target; and a main body to hold the flat conductor. The clip portion has a first projection, the main body has a second projection, and the first projection and the second projection protrude to be opposed each other. The clip portion and the main body are configured to allow switching from an unlocked state to a locked state. The locked state restricts a relative movement between the clip portion and the main body in an axial direction of the flat conductor due to an engagement between the first projection and the second projection. The unlocked state allows the relative movement in both sides in the axial direction.

5 Claims, 6 Drawing Sheets

CLAMP FOR FLAT CONDUCTOR, WIRE HARNESS, AND ASSEMBLY

CROSS-REFERENCE TO RELATED APPLICATIONS

This application is based on and claims priority under 35 USC 119 from Japanese Patent Application No. 2020-073042 filed on Apr. 15, 2020, the contents of which are incorporated herein by reference.

TECHNICAL FIELD

The present invention relates to a clamp (for a flat conductor) to be used in attaching a flat conductor to a prescribed attachment target (e.g., the body of a motor vehicle), a wire harness using the clamp, and an assembly using the clamp.

BACKGROUND ART

In recent, clamps that are used in fixing a bundle of plural electric wires to, for example, the body of a motor vehicle have been proposed. Among those clamps are one that is equipped with a clip member to be locked in a lock hole formed in a vehicle body or the like and a band-shaped support band to which the clip member is attached. This clamp is fixed to an electric wire bundle by fixing the support band to the electric wire bundle using an adhesive tape or the like after laying the support band along the axial direction of the electric wire bundle.

As for details of the above clamp, refer to JP 2013-085396 A.

In general, an electric wire bundle to which the above-described clamp is to be fixed has such stiffness as not to be bent easily because it is a bundle of plural electric wires. Thus, where an electric wire bundle is fixed to a vehicle body or the like after a number of the clamps are fixed to the electric wire bundle, usually the electric wire bundle extends almost straightly between the clamps (i.e., between fixing points where the electric wire bundle is fixed to the vehicle body or the like) and hence no deformation such as large bends occur in the electric wire bundle.

In contrast, where a flat conductor in which a flat-plate-shaped is covered with an insulating covering is used in place of the above-mentioned electric wire bundle, since in general the flat conductor is lower in stiffness than the above-mentioned electric wire bundle, deformations such as bends may occur in the flat conductor between the clamps after fixing of the flat conductor to the vehicle body or the like as long as the clamps are used as they are. When such deformations occur, the flat conductor may deviate from a design installation route and interfere with a nearby device, come into contact with, for example, the vehicle body during running of the motor vehicle to generate abnormal sound, or cause like problems. It is desirable to suppress such interference with a nearby device and generation of abnormal sound to as low levels as possible.

SUMMARY OF INVENTION

An aspect of a non-limiting embodiment of the present disclosure relates to provide a clamp capable of attaching a flat conductor to a prescribed attachment target, a wire harness using the clamp, and an assembly in which a flat conductor is fixed to an attachment target using the clamp.

Aspects of a certain non-limiting embodiment of the present disclosure address the features discussed above and/or other features not described above. However, aspects of the non-limiting embodiment are not required to address the above features, and aspects of the non-limiting embodiment of the present disclosure may not address the features described above.

According to an aspect of the present disclosure, there is provided a clamp for a flat conductor having a flat-plate-shaped conductor member, the clamp being used in attaching the flat conductor to an attachment target, the clamp comprising:

a clip portion to be engaged with the attachment target; and a main body to hold the flat conductor, the clip portion having a first projection, the main body having a second projection, and the first projection and the second projection protruding to be opposed each other, the clip portion and the main body being configured to allow switching from an unlocked state to a locked state, the locked state restricting a relative movement between the clip portion and the main body in an axial direction of the flat conductor due to an engagement between the first projection and the second projection, and the unlocked state allowing the relative movement in both sides in the axial direction.

BRIEF DESCRIPTION OF DRAWINGS

An exemplary embodiment of the present invention will be described in detail based on the following figures, wherein.

DESCRIPTION OF EMBODIMENT

Figure 1:
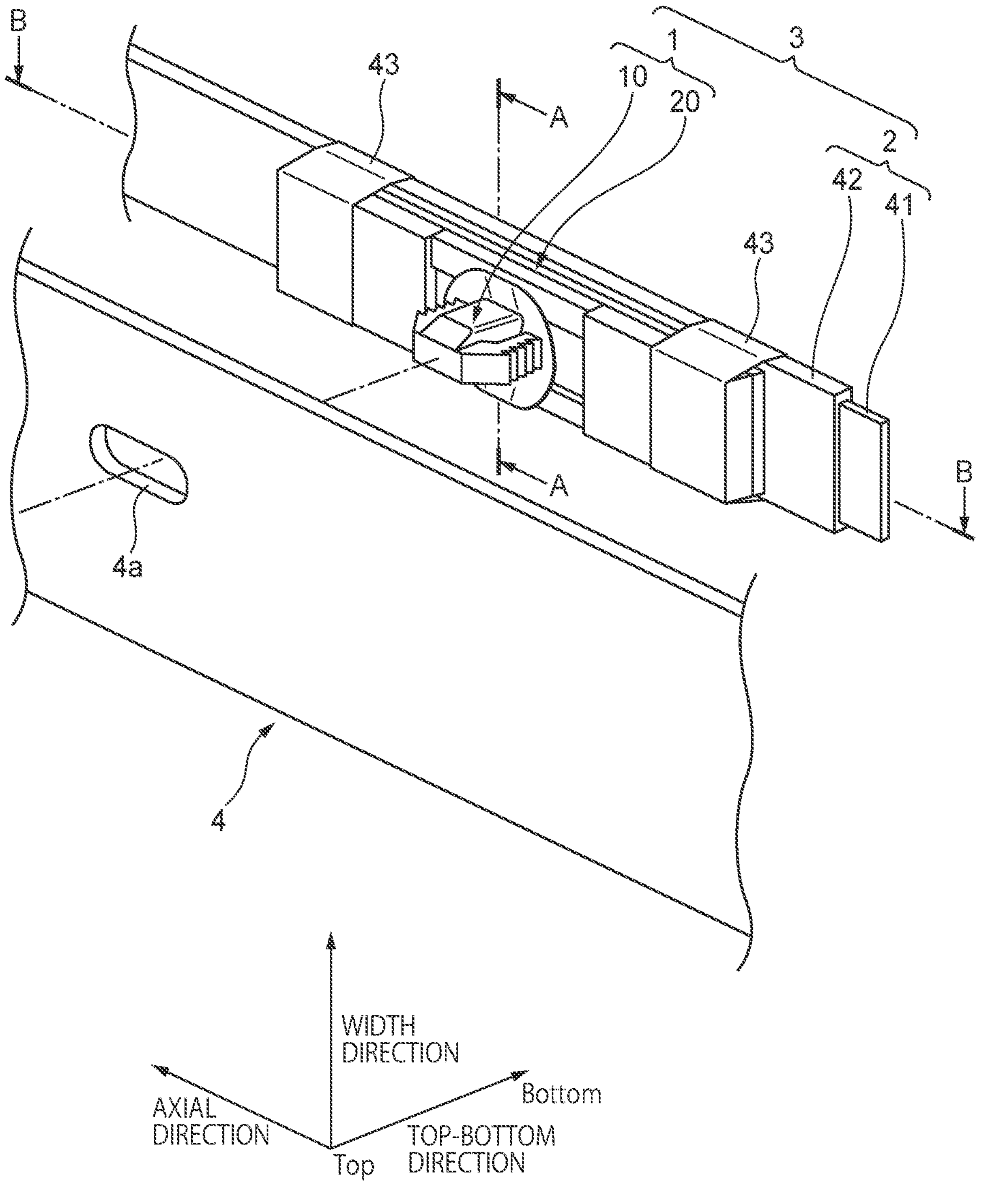
FIG. 1 is a perspective view showing a state that a wire harness using a clamp according to the exemplary embodiment of the invention is separated from the body of a motor vehicle that is an attachment target of the wire harness.
Figure 5A:
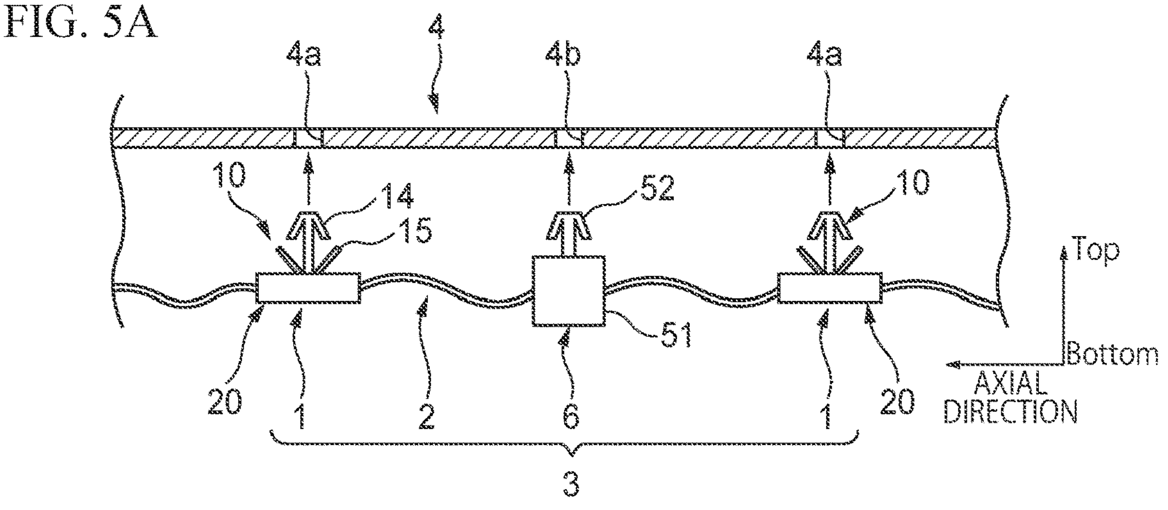
FIGS. 5A-5D are schematic sectional views illustrating, in time series order, a procedure for attaching a wire harness to one component of the body of the motor vehicle.
Figure 5B:
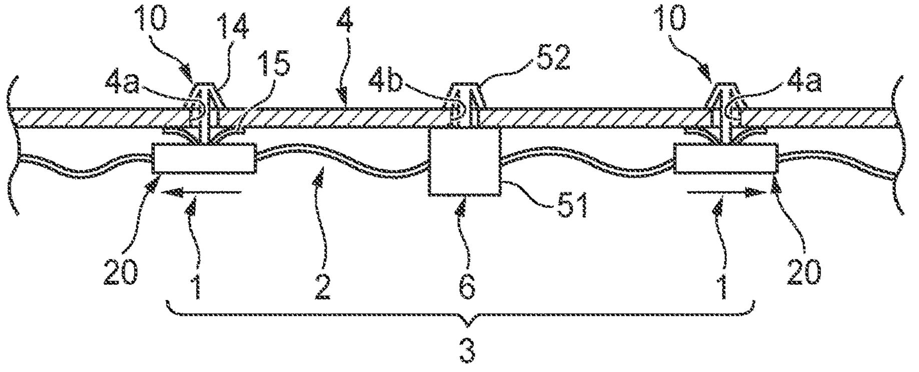
Figure 5C:
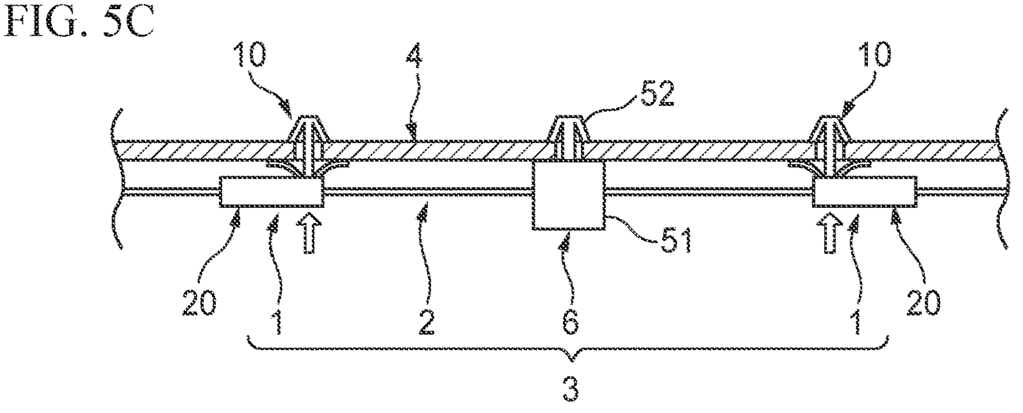
Figure 5D:
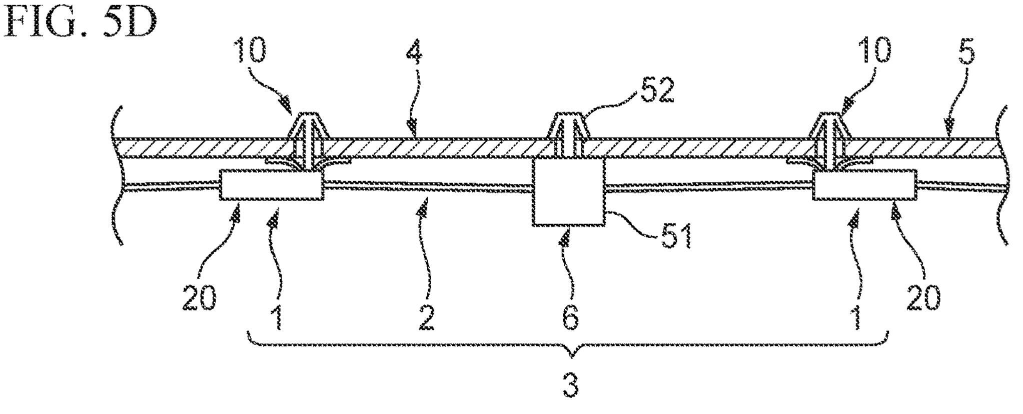

A clamp 1 for a flat conductor according to an exemplary embodiment of the present invention will be hereinafter described with reference to the drawings. As shown in FIG. 1, a wire harness 3 according to the exemplary embodiment of the invention is obtained by attaching clamps 1 to a flat conductor 2. An assembly 5 according to the exemplary embodiment of the invention is obtained as shown in FIG. 5D by attaching the wire harness 3 to a component 4 of the body of a motor vehicle that is an attachment target of the wire harness 3. An example of the component 4 is a door trim of the vehicle body.

In this example, as shown in FIG. 1 to FIGS. 3A-3C, the flat conductor 2 is composed of a flat-plate-shaped conductor member 41 extending in the axial direction and a resin covering 42 which covers the outer circumference of the conductor 41. The component 4 of the body of the motor vehicle is, in this example, a metal plate, and is formed with plural lock holes 4*a* (see FIGS. 1 and 5A-5D) for locking of the clamps 1 and a single lock hole 4*b* (see FIGS. 5A-5D) for locking of a positioning clamp 6 (described later) that is attached to the flat conductor 2 (wire harness 3), along a design installation route of the wire harness 3 at prescribed intervals.

For convenience of description, the axial direction, the width direction, the top-bottom direction, the top side, and the bottom side are defined as shown in FIG. 1. The axial direction, the width direction, the top-bottom direction are perpendicular to each other. The axial direction coincides with the axial direction of the flat conductor 2 (wire harness 3).

Each clamp 1 is made of a resin and is equipped with, as shown in FIG. 1, a clip portion 10 to be engaged with a lock hole 4*a* of the component 4 of the body of the motor vehicle and a main body 20 to hold the flat conductor 2. As described later, the clip portion 10 is to be attached to the main body 20 so as to be movable with respect to the latter toward one side and the other side in the axial direction. The clip portion 10 and the main body 20 of each clamp 1 will be described below in order.

Figure 2A:
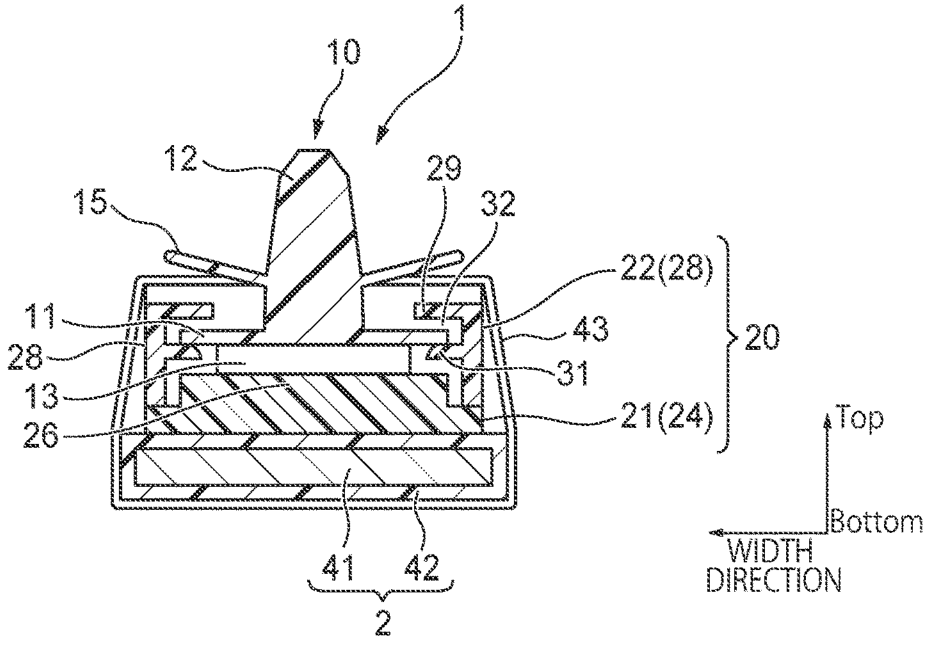
FIG. 2A is a sectional view, taken by a plane including line A-A in FIG. 1, of the clamp in an unlocked state.
Figure 2B:
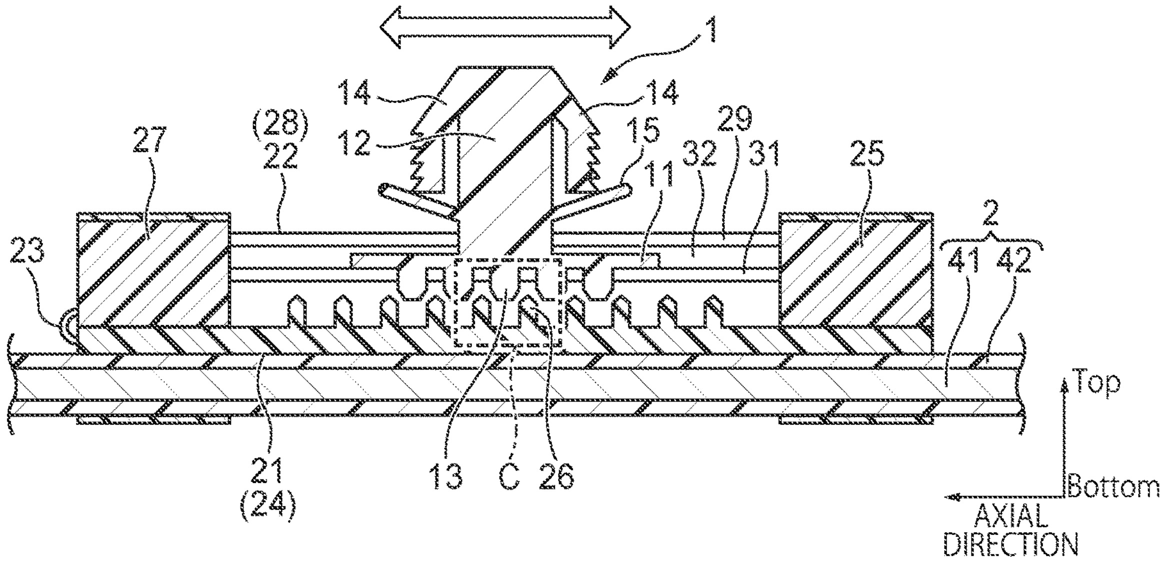
FIG. 2B is a sectional view, taken by a plane including line B-B in FIG. 1, of the clamp in the unlocked state.
Figure 2C:
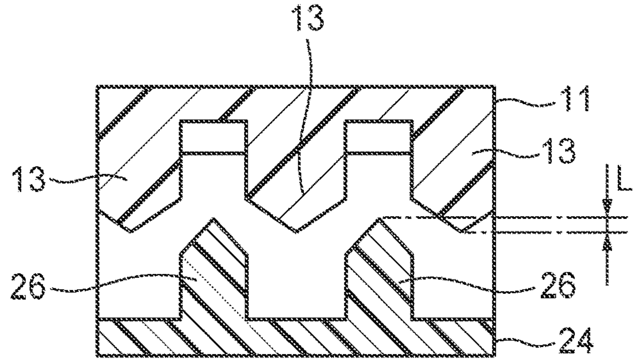
FIG. 2C is an enlarged view of part C in FIG. 2B.

First, the clip portion 10 will be described. As shown in FIGS. 2A-2C, the clip portion 10 is composed of, in a unitized manner, a rectangular flat plate-shaped substrate portion 11 having a pair of side flanges extending in the axial direction and a projected portion 12 which extends upward from a central portion, in the axial direction, of the substrate portion 11. The dimension of the substrate portion 11 in the axial direction is longer than that in the width dimension.

As shown in FIG. 2B, the bottom surface of the substrate portion 11 is formed with projections 13 which project downward and extend in the width direction in a central region excluding a pair of side end portions in the axial direction in such a manner that they are arranged at a prescribed pitch in the axial direction. As shown in FIG. 2C, a tip portion (bottom portion) of each projection 13 is tapered so as to have a pair of taper surfaces that are inclined so as to come closer to a plane perpendicular to the axial direction as the position goes downward. The projections 13 have a function of keeping the clamp 1 in an unlocked state or a locked state by engaging with projections 26 (described later) of the main body 20.

As shown in FIG. 2B, a tip portion (top portion) of the projected portion 12 is formed with a pair of lock arms 14 which extend downward from two respective end portions, in the axial direction, of the tip portion. The projected portion 12 is formed with, at a position that is lower than the tips lower ends) of the pair of lock arms 14, a brim 15 which extends outward in the radial direction of the projected portion 12 from its entire circumference. As shown in FIG. 5B, to engage the clip portion 10 with a lock hole 4*a* of the component 4 of the body of the motor vehicle, the clip portion 10 is locked on the component 4 by inserting the projected portion 12 into the lock hole 4*a* and clipping a periphery of the lock hole 4*a* by tip portions of the pair of lock arms 14 and the brim 15.

Figure 4A:
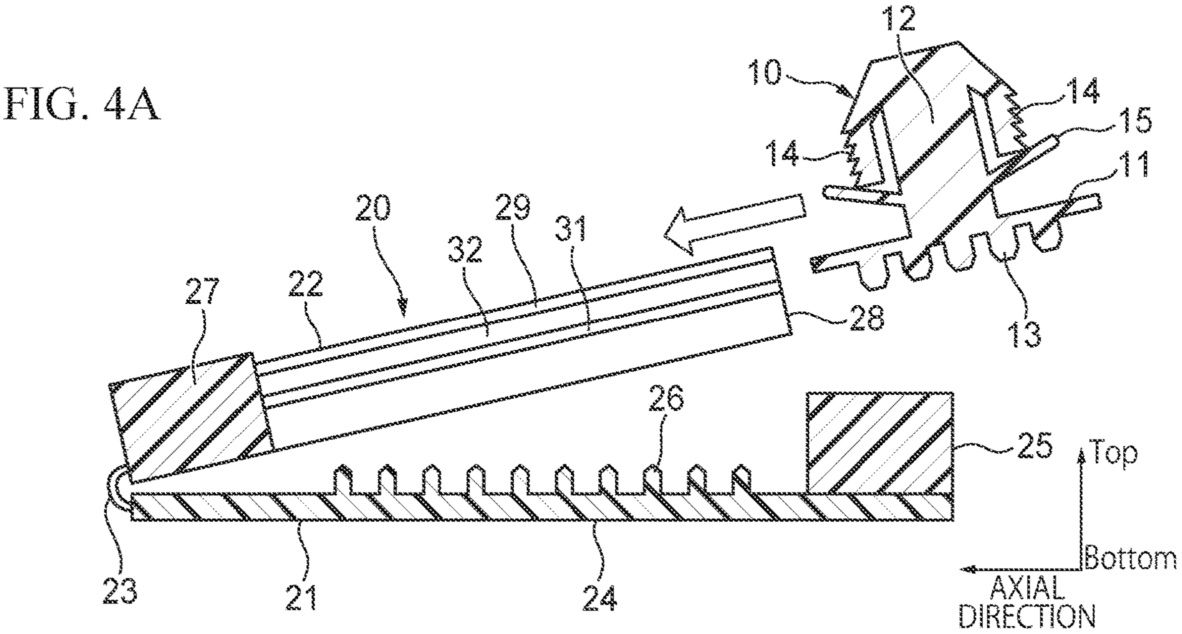
FIGS. 4A-4C are sectional views illustrating, in time series order, a procedure for attaching the clamp itself.
Figure 4B:
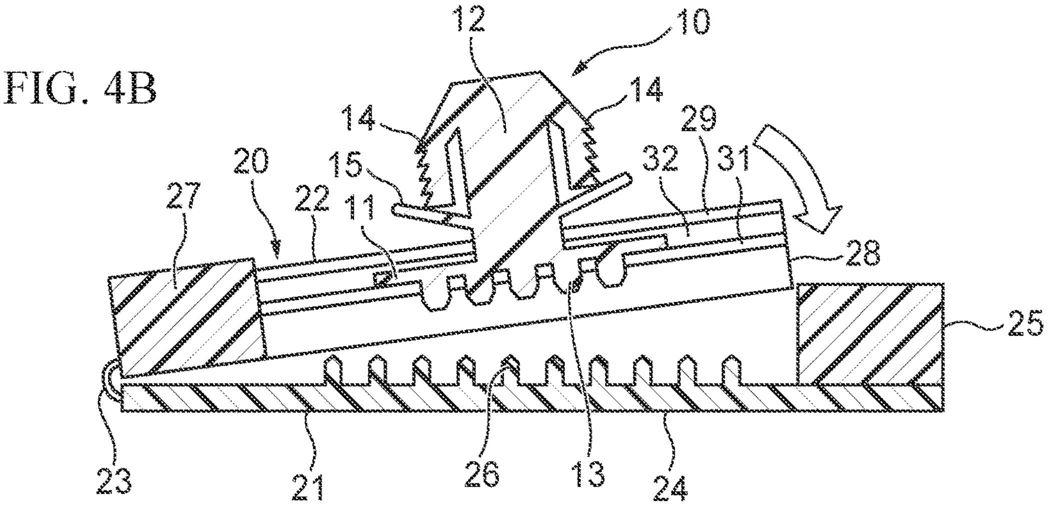
Figure 4C:
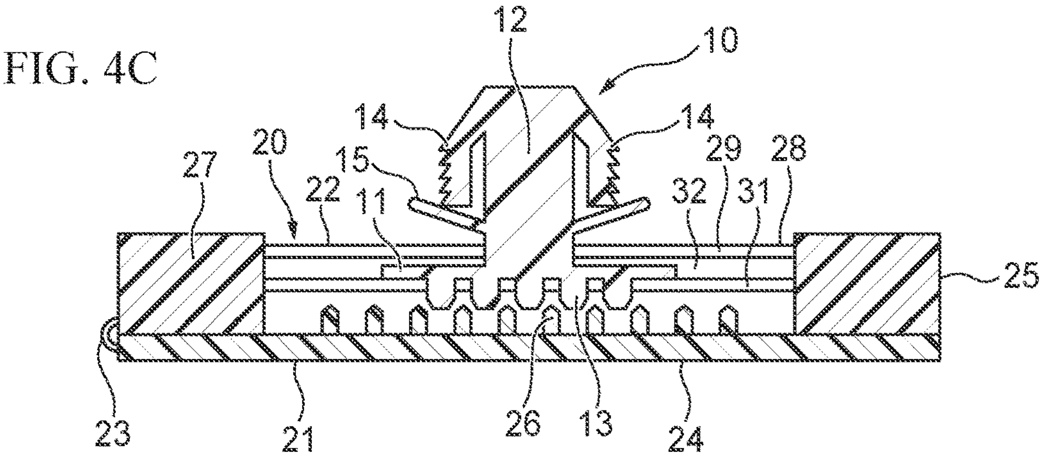

Next, the main body 20 will be described. As shown in FIGS. 4A-4C, the main body 20, which is made of a resin, is composed of a lower main body 21, an upper main body 22, and a hinge 23 which connects end portions, located on one side in the axial direction, of the lower main body 21 and the upper main body 22 so that they can rotate relative to each other.

As shown in FIGS. 4A-4C, the lower main body 21 is composed of a rectangular flat plate-shaped substrate portion 24 having a pair of side peripheries extending in the axial direction and a cuboid-shaped stopper portion 25 which projects from the top surface of an end portion, located on the other side, of the substrate portion 24. The substrate portion 24 is a portion to be held by the flat conductor 2. The stopper portion 25 has a function of defining an end, on the other side in the axial direction, of a region, movable relative to the main body 20 in the axial direction, of the clip portion 10.

As shown in FIGS. 4A-4C and 2B, projections 26 project upward from the top surface of a central region (between the stopper portion 25 and a stopper portion 27 (described later)), in the axial direction, of the substrate portion 24 and extend in the width direction in a central region in the width direction excluding a pair of side peripheral regions so as to be arranged in the axial direction at the same pitch as the projections 13, As shown in FIG. 2C, a tip portion (top portion) of each projection 26 is tapered so as to have a pair of taper surfaces that are inclined so as to come closer to a plane perpendicular to the axial direction as the position goes upward.

As shown in FIGS. 4A-4C, the upper main body 22 is composed of a cuboid-shaped stopper portion 27 which is located at one end in the axial direction and a pair of rectangular side plates 28 which extend toward the other end in the axial direction from two respective end portions, in the width direction, of the end surface, in the axial direction, of the stopper portion 27. The stopper portion 27 has a function of defining an end, on the one side, of the region, relatively movable with respect to the main body 20 in the axial direction, of the clip portion 10.

Figure 3A:
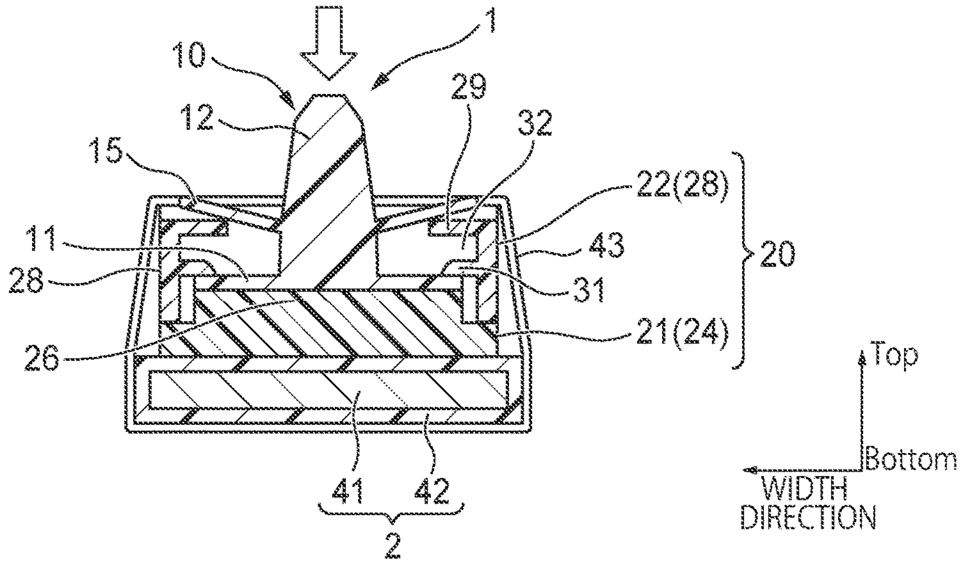
FIG. 3A is a sectional view, taken by a plane including line A-A in FIG. 1, of the clamp in a locked state.

As shown in FIGS. 2A and 3A, each side plate 28 is formed with an upper rail 29 which projects inward in the width direction from the top edge of the side plate 28 and extends along the entire side plate 28 in the axial direction and a lower rail 31 which projects inward in the width direction from the inside end surface, in the width direction, of the side plate 28 at a position a prescribed distance below the upper rail 29 and extends along the entire side plate 28 in the axial direction.

As a result, a pair of rail grooves 32 which are recessed outward in the width direction and are open inside in the width direction are formed between the pair of upper rails 29 and the pair of lower rails 31, respectively. The pair of rail grooves 32 are open at the other ends in the axial direction and the pair of side flanges of the substrate portion 11 of the clip portion 10 are inserted into the pair of rail grooves 32 from the other ends, in the axial direction, of the pair of rail grooves 32, respectively. That is, the pair of side plates 28 have a function of guiding the clip portion 10 in the axial direction relative to them.

The hinge 23 connects the end portions, on the one side in the axial direction, of the lower main body 21 and the upper main body 22 so as to be able to realize, for the main body 20, a "closed state" in which as shown in FIG. 4C the bottom surface of the stopper portion 27 is in contact with the top surface of the substrate portion 24 and the bottom surfaces of the pair of side plates 28 are in contact with the pair of side peripheries of the top surface of the substrate portion 24 (also see FIGS. 2A and 3A) and an "open state" in which as shown in FIGS. 4A and 4B the upper main body 22 is rotated away from the lower main body 21 starting from the closed state. The ends, on the other side in the axial direction, of the pair of side plates 28 (i.e., the pair of rail grooves 32) are closed by the stopper 25 in the closed state and are not closed by the stopper 25 in the open state. The descriptions of the clip portion 10 and the main body 20 of the clamp 1 are completed here.

Next, a procedure for assembling the clamp 1 itself will be described with reference to FIGS. 4A-4C. First, as shown in FIG. 4A, the pair of side flanges of the substrate portion 11 of the clip portion 10 are inserted from the ends, on the other side in the axial direction, of the pair of rail grooves 32 in a state that the main body 20 is kept in the open state. As a result, the clip portion 10 is supported by the pair of rail grooves 32 so as to be movable relative to them toward both of the one side and the other side in the axial direction.

Subsequently, as indicated by a white arrow shown in FIG. 4B, the upper main body 22 is rotated in such a direction as to come closer to the lower main body 21 to establish the closed state for the main body 20 as shown in FIG. 4C. In the closed state, it is preferable that the pair of side plates 28 be locked on the stopper portion 25 in an inseparable manner. The assembling of the clamp 1 itself is thus completed, whereby the clamp 1 shown in FIGS. 2A-2C is obtained.

Next, an "unlocked state" and a "locked state" of the assembling-completed clamp 1 (clip portion 10 and main body 20) will be described. As shown in FIGS. 2A-2C, when the clamp 1 is in a state that the clip portion 10 is supported so as to be movable in the axial direction relative to the pair of rail grooves 32, the tip portions of the plural projections 13 of the clip portion 10 interfere with the tip portions of the plural projections 26 of the lower main body 21 because the former and the latter overlap with each other by an interval L (see FIG. 2C) in the top-bottom direction. This state (i.e., the state shown in FIGS. 2A-2C) is referred to as an "unlocked state" of the clamp 1.

In the unlocked state, the clip portion 10 is positioned with respect to the main body 20 in the axial direction because the tip portions of the plural projections 13 and those of the plural projections 26 interfere with each other. On the other hand, in the unlocked state, the tip portions of the projections 13 can go over the tip portions of projections 26 by applying external force that is stronger than a prescribed value to the clip portion 10 in the axial direction in a state that the main body 20 is fixed because of temporary elastic deformation of the projections 13 and projections 26 and a vertical movement of the substrate portion 11 in the rail grooves 32 (that is, a vertical movement of the entire clip portion 10 in a range permitted by the rail grooves 32). Thus, as indicated by a white arrow in FIG. 2B, the clip portion 10 is allowed to move relative to the main body 20 to both of the one side and the other side in the axial direction. The clip portion 10 is movable in the range in the axial direction between the stopper portions 25 and 27.

Figure 3B:
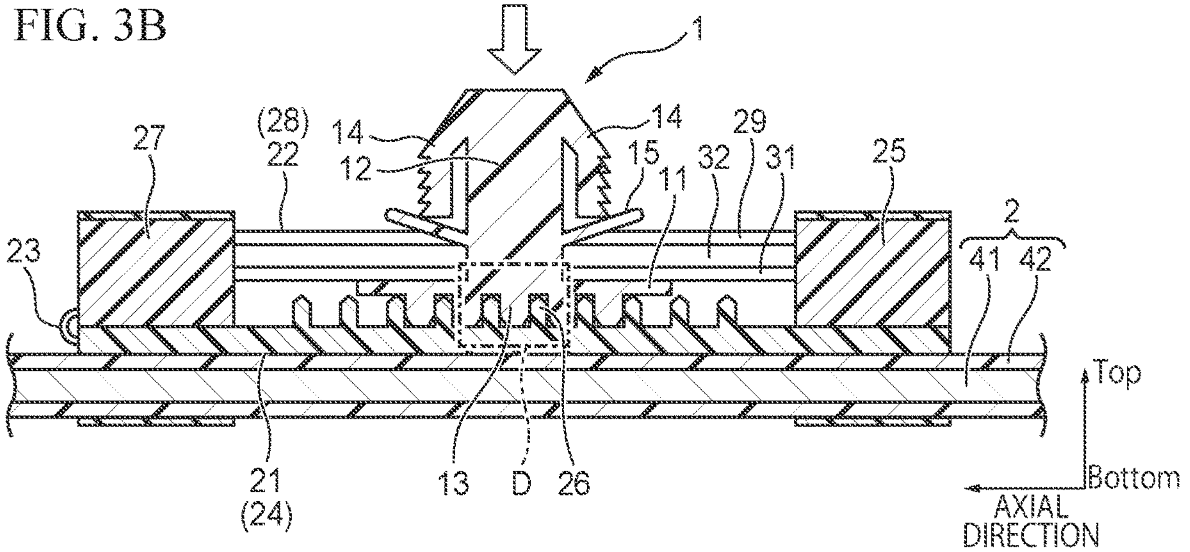
FIG. 3B is a sectional view, taken by a plane including line B-B in FIG. 1, of the clamp in the locked state.

When in the unlocked state shown in FIGS. 2A-2C external force that is stronger than a prescribed value is applied to the clip portion 10 downward (toward the main body 20) as indicated by a white arrow in FIGS. 3A and 3B in a state that the main body 20 is fixed, the pair of side flanges of the substrate portion 11 cause temporary elastic deformation of the pair of lower rails 31 and then go over the pair of lower rails 31, to establish a state that the pair of side flanges of the substrate portion 11 are located under the pair of lower rails 31 (see FIGS. 3A and 3B). This state (i.e., the state shown in FIGS. 3A-3C) is referred to as a "locked state" of the clamp 1. The state of the clamp 1 can also be switched from the unlocked state to the locked state by applying external force that is stronger than a prescribed value to the main body 20 upward (toward the clip portion 10; that is, in the direction opposite to the direction of the above case) in a state that the clip portion 10 is fixed.

Figure 3C:
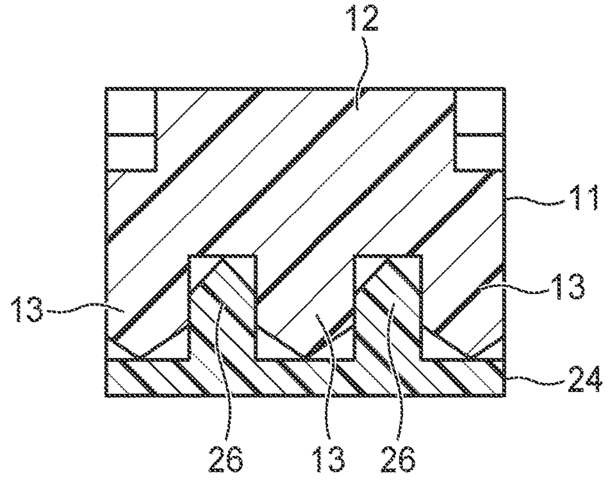
FIG. 3C is an enlarged view of part D in FIG. 3B.

In the locked state, as shown in FIG. 3C, not only the tip portions but also the base portions of the plural projections 13 interfere with those of the plural projections 26, whereby the plural projections 13 engage with the plural projections 26 strongly. As a result, movement of the clip portion 10 in the axial direction relative to the main body 20 is restricted, More specifically, movement of the clip portion 10 in the axial direction relative to the main body 20 is made substantially impossible except for a slight relative movement that is caused by manufacture allowances of the plural projections 13 and the plural projections 26 (i.e., unavoidable dimensional variations) and other factors.

As shown in FIG. 3A, the inside, in the width direction, tip surfaces of the pair of lower rails 31 are inclined so as to go inward in the width direction as the position goes downward. This suppresses a phenomenon that the clamp 1 returns unintentionally from the locked state shown in FIGS. 3A-3C to the unlocked state shown in FIGS. 2A-2C.

The clamp 1 having the above mechanisms is attached (fixed) to the flat conductor 2 in such a manner that as shown in FIG. 1 the bottom surface of the lower main body 21 faces and comes into contact with the top surface of the flat conductor 2. In the example shown in FIG. 1, the clamp 1 is attached to the flat conductor 2 by winding, together, a pair of tapes 43 on parts of the outer circumferences of both end portions, in the axial direction, of the main body 20 (more specifically, the stopper portion 25 and 27) and associated parts of the outer circumferences of the flat conductor 2 in a state that the bottom surface of the lower main body 21 faces and is in contact with the top surface of the flat conductor 2. The wire harness 3 according to the exemplary embodiment shown in FIG. 1 is obtained by attaching clamps 1 to the flat conductor 2 in this manner.

A procedure for attaching the wire harness 3 to the component 4 of the body of the motor vehicle will be described below with reference to FIGS. 5A-5D. In this example, as shown in FIG. 5A, plural clamps 1 each having the ratchet-like mechanism are attached to the flat conductor 2 of the wire harness 3 at prescribed intervals in the axial direction with the clip portions 10 up. At this stage, each clamp 1 is kept in the unlocked state. Plural lock holes 4*a* for locking of the clamps 1 are formed through the component 4 at prescribed intervals in a design installation route of the wire harness 3 according to the arrangement, in the axial direction, of the plural clamps 1 in the wire harness 3.

Furthermore, a single positioning clamp 6 is attached to the flat conductor 2 of the wire harness 3 at one position in the axial direction with a clip portion 52 up. The clamp 6 is a clamp that is composed of a main body 51 attached (fixed) to the wire harness 3 at one position in the axial direction and a clip portion 52 provided in the main body 51 so as not to be able to move relative to the main body 51 but does not have what is called a ratchet-like mechanism. The clamp 6 has a function of determining a reference position for the wire harness 3 in the axial direction (i.e., the direction along the installation route) with respect to the component 4. As shown in FIG. 5A, a single lock hole 4*b* for locking of the clamp 6 is formed through the component 4 on the design installation route of the wire harness 3 at a position corresponding to an axial position of the single clamp 6 in the wire harness 3.

To attach the wire harness 3 to the component 4 of the body of the motor vehicle, first, the wire harness 3 is brought closer to the component 4 from below as indicated by black arrows in FIG. 5A and the clip portions 10 of the plural clamps 1 and the clip portion 52 of the single clamp 6 are inserted into the lock holes 4*a* and 4*b* of the component 4 from below, respectively, as shown in FIG. 5B. As a result, the plural clamps 1 and the single clamp 6 are locked in the lock holes 4*a* and 4*b* of the component 4, respectively, and the wire harness 3 (flat conductor 2) is attached to the component 4.

In this state, since the clamp 6 is locked in the lock hole 4*b*, the reference position for the wire harness 3 in the axial direction (i.e., the direction along the installation route) with respect to the component 4 is determined. That is, the clamp 6 constitutes a "positioning structure," a term used in the claims.

The wire harness 3 includes the flat conductor 2. In general, the stiffness of the flat conductor 2 is lower than a bundle of plural electric wires. Thus, in the example shown in FIGS. 5A and 5B, deformations such as bends occur in the flat conductor 2 between adjacent clamps 1 and between the clamp 6 and each adjacent clamp 1 not only before attachment of the wire harness 3 to the component 4 (see FIG. 5A) but also after the attachment (see FIG. 5B). When such deformations occur, the flat conductor 2 may deviate from the design installation route and interfere with a nearby device, vibrate during running of the motor vehicle and come into contact with, for example, the vehicle body to generate abnormal sound, or cause a like problem. It is desirable to suppress such interference with a nearby device and generation of abnormal sound to as low levels as possible.

In view of the above, the ratchet-shaped mechanism of each clamp 1 is utilized. In the example shown in FIG. 5B, the main body 20 of each clamp 1 being in the unlocked state is moved in the direction indicated by a black arrow toward the clip portion 10. As a result, as shown in FIG. 5C, bends etc. of the flat conductor 2 are corrected and the wire harness 3 can be stretched into an almost straight shape (after attachment of the wire harness 3 to the component 4).

Subsequently, as indicated by white arrows in FIG. 5C, the main body 20 of each clamp 1 being in the unlocked state is pressed upward against the corresponding clip portion 10. As a result, each clamp 1 makes a transition from the unlocked state to the locked state, whereby in each clamp 1 the clip portion 10 is made incapable of moving in the axial direction relative to the main body 20. Thus, as shown in FIG. 5D, the wire harness 3 is kept in the state that it is stretched almost straightly. The attachment of the wire harness 3 to the component 4 of the body of the motor vehicle is thus completed, whereby an assembly 5 according to the exemplary embodiment is obtained.

As described above, in the clamp 1 according to the exemplary embodiment, the clip portion 10 to be engaged with the component 4 of the body of the motor vehicle and the main body 20 to hold the flat conductor 2 are configured so as to enable switching from the unlocked state that a relative movement between the clip portion 10 and the main body 20 is possible to the locked state that such a relative movement is restricted. That is, the clamp 1 has what is called a ratchet-shaped structure. As a result, the position of the clip portion 10 with respect to the flat conductor 2 can be changed even after the main body 20 of the clamp 1 is fixed to the flat conductor 2. Conversely, the main body 20 can be moved with respect to the clip portion 10 after locking of the clip portion 10 on the component 4 (i.e., after attachment of the flat conductor 2 to the component 4). Thus, the state of the clamp 1 can be switched to the locked state after attaching the clamp 1 attached to the flat conductor 2 and being in the unlocked state to the attachment target 4 and then moving the main body 20 so that bends etc. of the flat conductor 2 are corrected and the flat conductor 2 is stretched into an almost straight shape. As such, the clamp 1 having this configuration can attach the flat conductor 2 to the component 4 of the body of the motor vehicle properly.

Furthermore, in the clamp 1 according to the exemplary embodiment, the clamp 1 is prevented from returning from the locked state to the unlocked state. This makes it possible to prevent a phenomenon that the clamp 1 being in the locked state returns to the unlocked state unintentionally. As a result, the clamp 1 makes it possible to keep, satisfactorily, a state that the flat conductor 2 is attached to the component 4 properly.

Still further, in the clamp 1 according to the exemplary embodiment, the clip portion 10 in the unlocked state can be positioned easily through interference between the tip portions of the plural projections 13 of the clip portion 10 and the tip portions of the projections 26 of the main body 20. This makes it possible to increase the efficiency of work of locking the clip portion 10 in a lock hole 4*a* of the component 4 of the body of the motor vehicle.

As described above, by virtue of the workings of the clamps 1, the wire harness 3 according to the exemplary embodiment has a function that it can be attached to the component 4 of the body of the motor vehicle. In addition, by virtue of the workings of the clamps 1, the assembly 5 according to the exemplary embodiment can be used as a vehicular module in which the flat conductor 2 is routed properly. An example of the assembly 5 is a door module in which the flat conductor 2 is fixed to a door trim of a vehicle by clamps 1.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

In the above-described embodiment, in the unlocked state, the tip portions (i.e., the tapered portions each having a pair of taper surfaces) of the plural projections 13 of the clip 10 interfere with the tip portions (i.e., the tapered portions each having a pair of taper surfaces) of the plural projections 26 of the lower main body 21 because the former and the latter overlap with each other by the interval L in the top-bottom direction (see FIG. 2C).

Figure 6A:
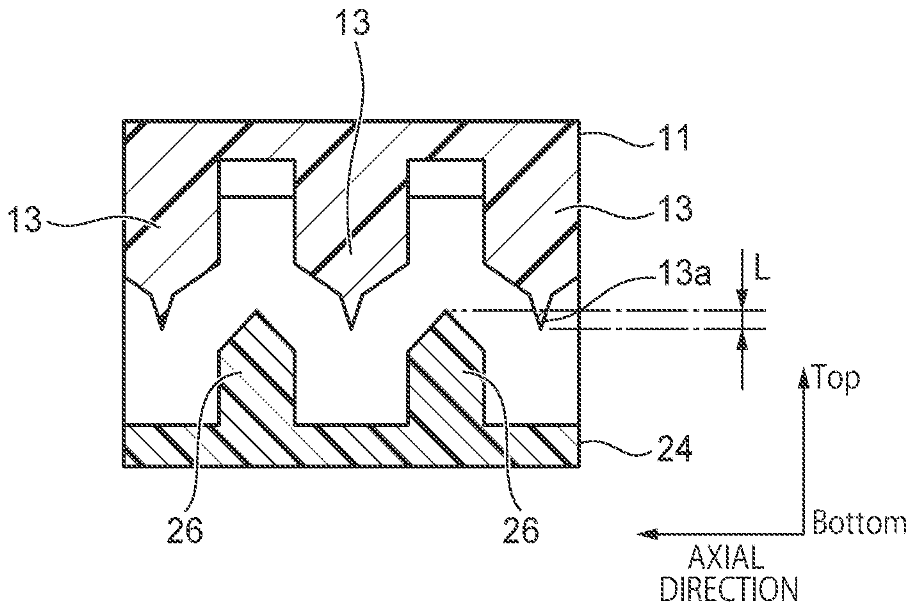
FIG. 6A is a sectional view, corresponding to FIG. 2C, of a clamp of a modification

Alternatively, as shown in FIG. 6A, the tip portion (i.e., the tapered portion having a pair of taper surfaces) of each projection 13 of the clip 10 may be formed with a projection strip portion 13*a* which projects downward from the tip portion and extends in the width direction. In this case, in the unlocked state, the projection strip portions 13*a* of the plural projections 13 of the clip portion 10 overlap with the tip portions (i.e., the tapered portions each having a pair of taper surfaces) of the plural projections 26 of the lower main body 21 in the top-bottom direction by an interval L and thereby interfere with the latter.

Figure 6B:
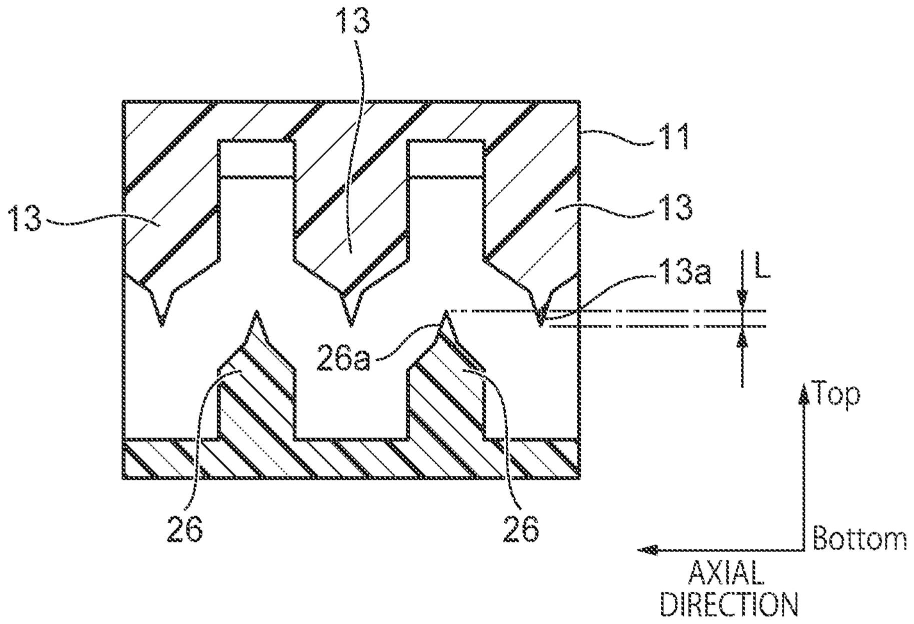
FIG. 6B is a sectional view, corresponding to FIG. 2C, of a clamp of another modification.

As another alternative, as shown in FIG. 6B, the tip portion (i.e., the tapered portion having a pair of taper surfaces) of each projection 26 of the lower main body 21 may also be formed with a projection strip portion 26*a* which projects upward from the tip portion and extends in the width direction. In this case, in the unlocked state, the projection strip portions 13*a* of the plural projections 13 of the clip portion 10 overlap with the projection strip portions 26*a* of the plural projections 26 of the lower main body 21 in the top-bottom direction by an interval L and thereby interfere with the latter.

In the above-described embodiment, the wire harness 3 is equipped with the positioning clamp 6 in addition to the plural clamps 1. Alternatively, the wire harness 3 may be equipped with a clamp 1 that is always kept in the locked state in place of the positioning clamp 6. As another alternative, the positioning clamp 6 may be omitted. In this case, the lock hole 4*b* for the positioning clamp 6 can be omitted in the component 4 of the body of the motor vehicle. In these manners, another member or structure may be employed in place of the positioning clamp 6 as long as it can perform the function of determining the reference position of the flat conductor 2.

In the above-described embodiment, each clamp 1 in the unlocked state is moved to a proper position and its state is switched to the locked state after it is attached to the component 4. When it has become necessary to return the state of each clamp 1 to the unlocked state for the purpose of, for example, maintenance of the motor vehicle, the state of each clamp 1 can be returned to the unlocked state forcibly by applying a sufficiently strong external force to its clip portion 10 upward (i.e., in the direction going away from the main body 20) to cause the pair of side flanges of the substrate portion 11 to be elastically deformed upward temporarily and then go over the pair of lower rails 31.

According to the above exemplary embodiment, a clamp (1) for a flat conductor (2) has a flat-plate-shaped conductor member (41), the clamp (1) is used in attaching the flat conductor (2) to an attachment target (4), the clamp (1) comprises: a clip portion (10) to be engaged with the attachment target (4); and a main body (20) to hold the flat conductor (2). The clip portion (10) has a first projection (13), the main body (20) has a second projection (26), and the first projection (13) and the second projection (26) protrudes to be opposed each other. The clip portion (10) and the main body (20) are configured to allow switching from an unlocked state to a locked state. The locked state restricts a relative movement between the clip portion (10) and the main body (20) in an axial direction of the flat conductor (2) due to an engagement between the first projection (13) and the second projection (26). The unlocked state allows the relative movement in both sides in the axial direction.

In the clamp for a flat conductor having this configuration, the clip portion to be engaged with an attachment target such as a vehicle body and the main body to hold the flat conductor are configured so as to enable switching from the unlocked state that a relative movement between the clip portion and the main body is possible to the locked state that such a relative movement is restricted. That is, the clamp has what is called a ratchet-shaped structure. As a result, the position of the clip portion with respect to the flat conductor can be changed even after the main body of the clamp is fixed to the flat conductor as long as the clamp is in the unlocked state. Conversely, the main body can be moved with respect to the clip portion after locking of the clip portion on the attachment target (i.e., after attachment of the flat conductor to the attachment target).

Thus, the state of the clamp can be switched to the locked state after, for example, attaching the clamp attached to the flat conductor and being in the unlocked state to the attachment target and then moving the main body of the clamp so that bends etc. of the flat conductor are corrected and the flat conductor is stretched into a straight shape. As such, the clamp having this configuration can attach the flat conductor to a prescribed attachment target properly.

The clip portion (10) and the main body (20) may be configured to restrict switching from the locked state to the unlocked state.

In the clamp for a flat conductor having this configuration, the clamp is prevented from returning from the locked state to the unlocked state. For example, this makes it possible to prevent a phenomenon that the clamp being in the locked state with the flat conductor extending straightly returns to the unlocked state unintentionally. As a result, the clamp having this configuration makes it possible to keep, satisfactorily, a state that the flat conductor is attached to the attachment target properly.

The clip portion (10) may be positioned with respect to the main body (20) due to a contact between tip portions of the first projection (13) and the second projection (26) in the unlocked state.

According to the clamp for a flat conductor having this configuration, the clip portion in the unlocked state can be positioned easily. This makes it possible to increase the efficiency of work of locking the clip portion on the attachment target at a prescribed position (e.g., in a lock hole of a vehicle body).

According to the above exemplary embodiment, a wire harness (3) comprises: a flat conductor (2) having a flat-plate-shaped conductor member; the clamp (1) attached to the flat conductor (2); and a positioning structure (6, 4*b*) to determine a reference position of the flat conductor (2) with respect to an attachment target (4) upon attaching the flat conductor (2) to the attachment target (4).

In the wire harness having this configuration, each clamp attached to the flat conductor is configured so that switching can be made from the unlocked state that a relative movement between the clip portion to be engaged with an attachment target such as a vehicle body and the main body that holds the flat conductor is possible to the locked state such a relative movement is restricted. That is, each clamp has what is called a ratchet-shaped structure. As a result, the position of the clip portion with respect to the flat conductor can be changed even after the main body of each clamp is fixed to the flat conductor as long as the clamp is in the unlocked state. Conversely, the main body can be moved with respect to the clip portion after locking of the clip portion on the attachment target (i.e., after attachment of the flat conductor to the attachment target). Thus, for example, after each clamp attached to the flat conductor and being in the unlocked state is attached to the attachment target, the state of the clamp can be switched to the locked state after the flat conductor is stretched into a straight shape by moving the main body of each clamp so that bends etc. of the flat conductor are corrected. As such, the wire harness having this configuration can be attached to a prescribed attachment target properly.

According to the above exemplary embodiment, an assembly (5) comprises: a flat conductor (2) having a flat-plate-shaped conductor member; the clamp (1) attached to the flat conductor (2); and an attachment target (4) for the flat conductor (2). The flat conductor (2) is attached to the attachment target (4) using the clamp (1).

According to the assembly having this configuration, the flat conductor can be disposed along a design installation route by, for example, attaching the clamps attached to the flat conductor and being in the unlocked state to the attachment target, then moving the main body of each clamp so that bends etc. of the flat conductor are corrected and the flat conductor is stretched into an almost straight shape, and finally switching the state of each clamp to the locked state. As such, the assembly having this configuration can suppress interference between the flat conductor and a nearby device and generation of abnormal sound by routing the flat conductor properly utilizing the workings of the clamps.

As described above, the invention can provide a clamp capable of attaching a flat conductor to a prescribed attachment target, a wire harness using such clamps, and an assembly in which a flat conductor is fixed to an attachment target using such clamps.

What is claimed is:

1. A clamp for a flat conductor having a flat-plate-shaped conductor member, the clamp configured to be used in attaching the flat conductor to an attachment target, the clamp comprising:

a clip portion configured to be engaged with the attachment target, and including a first projection portion, the first projection portion including a plurality of first projections; and a main body configured to hold the flat conductor, the main body having a second projection portion which is opposed to the first projection portion, the second projection portion including a plurality of second projections, wherein the clip portion and the main body are switchable between an unlocked state, in which the first projection portion and the second projection portion are not engaged with each other when the first projection portion and the second projection portion are stationary, and a locked state, in which the first projection portion and the second projection portion are engaged with each other such that a projection of the plurality of first projections fits in between two projections of the plurality of second projections or a projection of the plurality of second projections fits in between two projections of the plurality of first projections, and the locked state is a state in which a relative movement between the clip portion and the main body in both of axial directions of the flat conductor is restricted by the first and second projection portions, and the unlocked state being a state in which the relative movement in the axial directions of the flat conductor is not restricted, and each projection of each of the first and second plurality of projections has a tip portion having a pair of tapered surfaces, wherein in the unlocked state, the tip portions of each of the plurality of first projections overlaps the tip portions of each of the plurality of second projections by a distance in a direction perpendicular to the axial directions of the flat conductor.

2. The clamp according to claim 1, wherein the clip portion and the main body are configured to restrict switching from the locked state to the unlocked state.

3. The clamp according to claim 1, wherein the clip portion is configured to be positioned with respect to the main body due to a contact between the tip portions of the first and second plurality of projections of the respective first projection portion and the second projection portion in the unlocked state.

4. A wire harness comprising:

the clamp according to claim 1;

the flat conductor having the flat-plate-shaped conductor member which the clamp according to claim 1 is for; wherein the clamp is attached to the flat conductor; and a positioning structure configured to determine a reference position of the flat conductor with respect to the attachment target upon attaching the flat conductor to the attachment target.

5. An assembly comprising:

the clamp according to claim 1;

the flat conductor having the flat-plate-shaped conductor member which the clamp according to claim 1 is for; wherein the clamp is attached to the flat conductor; and the attachment target for the flat conductor, the flat conductor being attached to the attachment target using the clamp.

* * * * *